US012389191B2

(12) United States Patent
Varughese

(10) Patent No.: US 12,389,191 B2
(45) Date of Patent: Aug. 12, 2025

(54) SYSTEM AND METHOD FOR GENERATING A MAP OF A LINE ARRAY OF LOUDSPEAKERS ASSEMBLIES

(71) Applicant: HARMAN INTERNATIONAL INDUSTRIES, INCORPORATED, Stamford, CT (US)

(72) Inventor: Jobin Mathew Varughese, Dallas, TX (US)

(73) Assignee: Harman International Industries, Incorporated, Stamford, CT (US)

( * ) Notice: Subject to any disclaimer, the term of this patent is extended or adjusted under 35 U.S.C. 154(b) by 203 days.

(21) Appl. No.: 18/251,416

(22) PCT Filed: Nov. 4, 2020

(86) PCT No.: PCT/US2020/058962
§ 371 (c)(1),
(2) Date: May 2, 2023

(87) PCT Pub. No.: WO2022/098353
PCT Pub. Date: May 12, 2022

(65) Prior Publication Data

US 2024/0015468 A1 Jan. 11, 2024

(51) Int. Cl.
*H04S 7/00* (2006.01)
*H04R 1/32* (2006.01)
(Continued)

(52) U.S. Cl.
CPC ............... *H04S 7/40* (2013.01); *H04R 1/323* (2013.01); *H04R 2201/403* (2013.01); *H04R 2430/20* (2013.01); *H04S 2400/11* (2013.01)

(58) Field of Classification Search
None
See application file for complete search history.

(56) References Cited

U.S. PATENT DOCUMENTS

2011/0123054 A1 5/2011 Adamson et al.
2015/0163616 A1* 6/2015 Chatterjee ................ H04R 5/02 381/303

FOREIGN PATENT DOCUMENTS

EP 2884764 A1 6/2015

OTHER PUBLICATIONS

International Search Report dated Jul. 12, 2021 for PCT Appn. No. PCT/US2020/058962 filed Nov. 4, 2020, 12 pgs.

(Continued)

*Primary Examiner* — Qin Zhu
(74) *Attorney, Agent, or Firm* — Brooks Kushman P.C.

(57) ABSTRACT

In at least one embodiment, a system for generating a location map for a plurality of loudspeakers assemblies in a line array is provided. The system includes a first loudspeaker assembly that includes at least one controller. The at least one controller is programmed to receive a first unique identifier from a first adjacent loudspeaker assembly positioned in the line array. The first unique identifier is indicative of a location of the first adjacent loudspeaker assembly relative to the first loudspeaker assembly. The at least one controller is further programmed to generate a message including the first unique identifier which is indicative of a location the first adjacent loudspeaker assembly relative to the first loudspeaker assembly and to transmit the message to a server to generate the location map of the first loudspeaker assembly relative to the first adjacent loudspeaker assembly.

20 Claims, 4 Drawing Sheets

(51) Int. Cl.
*H04R 5/04* (2006.01)
*H04R 29/00* (2006.01)

(56) References Cited

OTHER PUBLICATIONS

International Preliminary Report on Patentability dated May 19, 2023 for PCT Appn. No. PCT/US2020/058962 filed Nov. 4, 2020, 7 pgs.
European Office Action dated Jun. 2, 2025 for European Application No. 20821449.4 filed Apr. 26, 2023, 4 pgs.

* cited by examiner

450

| 452a | 452b | 452c | 452d | 452e |
|---|---|---|---|---|
| Byte 1 | Byte 2 | Byte 3 | Byte 4 | Byte 5 |
| <<Speaker ID>> | 'L' | <<Reading by Lower NFC Reader>> | 'U' | <<Reading by Upper NFC Reader>> |

Fig-4

450

| 460 | 452a | 452b | 452c | 452d | 452e |
|---|---|---|---|---|---|
| Loudspeaker Assembly | Byte 1 | Byte 2 | Byte 3 | Byte 4 | Byte 5 |
| 100a (Unique Identifier = 01) | 01 | L | FD | U | *FF |
| 100b (Unique Identifier = FD) | FD | L | FC | U | 01 |
| 100c (Unique Identifier = FC) | FC | L | FE | U | FD |
| 100d (Unique Identifier = FE) | FE | L | FF* | U | FC |

*-Denotes the Predefined Symbol "FF" to Indicate that the Loudspeaker Assembly 100a is Unable to Receive the Unique Identifier from a Loudspeaker Assembly Positioned Above the Loudspeaker Assembly 100a or to Indicate that the Loudspeaker Assembly 100d is Unable to Receive the Unique Identifier from a Loudspeaker Assembly Positioned Below the Loudspeaker Assembly 100d

Fig-5

SYSTEM AND METHOD FOR GENERATING A MAP OF A LINE ARRAY OF LOUDSPEAKERS ASSEMBLIES

CROSS-REFERENCE TO RELATED APPLICATION

This application is the U.S. national phase of PCT Application No. PCT/US2020/058962 filed on Nov. 4, 2020, the disclosure of which is incorporated in its entirety by reference herein.

TECHNICAL FIELD

Aspects disclosed herein generally relate to a system and method for generating a map of a line array of loudspeakers assemblies. In one aspect, one or more communication tags (or communication receivers) may be positioned at a top and at a bottom of each loudspeaker assembly in a line array. Additionally, each loudspeaker assembly may include a communication transmitter. Each loudspeaker assembly may be assigned a unique identifier. Each communication tag may transmit the unique identifier to an adjacent loudspeaker assembly. Each communication transmitter may also transmit a message to a server or controller (or central hub) that include the unique identifier for the loudspeaker assembly in addition to the unique identifier for adjacent loudspeaker assemblies. The server may collate all of the received messages to generate a map of the unique identifiers that is sorted based on their position. These aspects and others will be discussed in more detail below.

BACKGROUND

Line array loudspeakers are a staple nowadays in large music concerts, stadiums, and auditoriums. Such loudspeakers are not only scalable, but also provide excellent audio quality and flexibility. However, line array speakers may come with their own unique set of challenges that is not present with traditional speakers like mid/low-frequency energy build-up and adjustment for speaker weight, etc. However, several problems remain unresolved with the loudspeakers of a line array. For example, it may be difficult to identify the position or location of the loudspeakers in the array.

Generally, the assembly of the loudspeakers in the array is performed at the venue. Once the loudspeakers are assembled and placed into position within the array, it may be challenging to access loudspeakers. The placement of the speakers is usually performed at great heights in the venue. Often times, it is often not feasible to work on or to service these loudspeakers during a live concert or performance. Various implementations used to determine the location of a loudspeaker in the array involve measuring an amount of current that flows through each loudspeaker. However, a number of these solutions are complex, and the amount of engineering time spent on implementing these methodologies is not feasible.

SUMMARY

In at least one embodiment, a system for generating a location map for a plurality of loudspeakers assemblies in a line array is provided. The system includes a first loudspeaker assembly that includes at least one controller. The at least one controller is programmed to receive a first unique identifier from a first adjacent loudspeaker assembly positioned in the line array. The first unique identifier is indicative of a location of the first adjacent loudspeaker assembly relative to the first loudspeaker assembly. The at least one controller is further programmed to generate a message including the first unique identifier which is indicative of a location the first adjacent loudspeaker assembly relative to the first loudspeaker assembly and to transmit the message to a server to generate the location map of the first loudspeaker assembly relative to the first adjacent loudspeaker assembly.

In at least one embodiment, a method for generating a location map for a plurality of loudspeaker assemblies in a line array is provided. The method includes receiving at a first loudspeaker assembly a first unique identifier from a first adjacent loudspeaker assembly positioned in the line array, the first unique identifier being indicative of a location of the first adjacent loudspeaker assembly relative to the first loudspeaker assembly and generating, at the first loudspeaker assembly, a message including the first unique identifier which is indicative of a location the first adjacent loudspeaker assembly relative to the first loudspeaker assembly. The method further includes transmitting the message to a server to generate the location map of the first loudspeaker assembly relative to the first adjacent loudspeaker assembly.

In at least one embodiment, a computer-program product embodied in a non-transitory computer read-able medium that is programmed for generating a location map for a plurality of loudspeaker assemblies in a line array. The computer-program product includes instructions for receiving at a first loudspeaker assembly a first unique identifier from a first adjacent loudspeaker assembly positioned in the line array, the first unique identifier being indicative of a location of the first adjacent loudspeaker assembly relative to the first loudspeaker assembly and for generating, at the first loudspeaker assembly, a message including the first unique identifier which is indicative of a location the first adjacent loudspeaker assembly relative to the first loudspeaker assembly. The computer-program product includes instructions for transmitting the message to a server to generate the location map of the first loudspeaker assembly relative to the first adjacent loudspeaker assembly.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIG. 4 generally depicts a message format of data as transmitted from a first loudspeaker assembly of the line array in accordance to one embodiment;

FIG. 5 depicts an example of data that is transmitted by the various loudspeaker assemblies of FIG. 2 in accordance to one embodiment.

DETAILED DESCRIPTION

Figure 1:
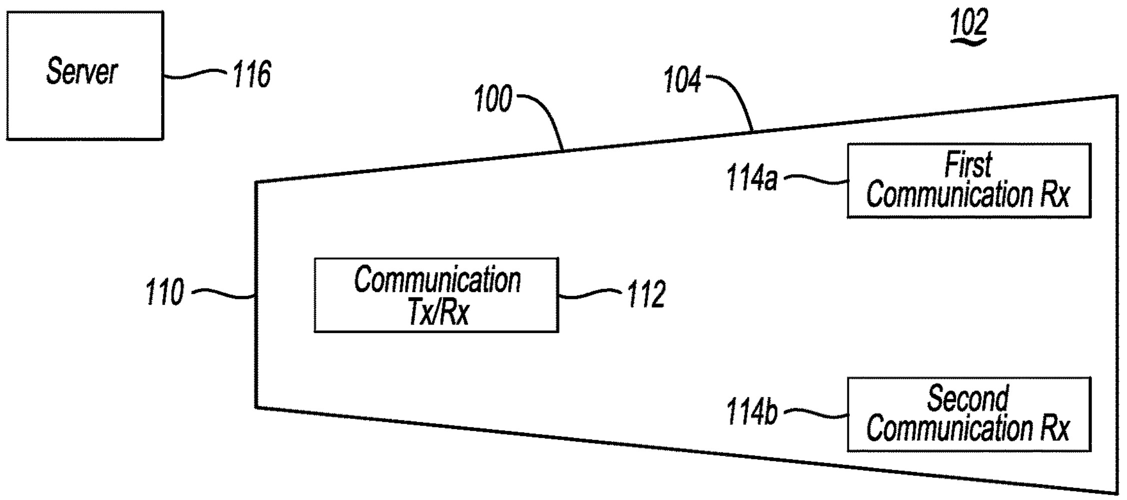
FIG. 1 generally depicts an example of a loudspeaker assembly for a line array of loudspeakers in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilize one or more microprocessors to execute a computer-program product that is embodied in a non-transitory computer readable medium that is programmed to perform any number of the functions as disclosed. Further, the controller(s) as provided herein includes a housing and the various number of microprocessors, integrated circuits, and memory devices (e.g., FLASH, random access memory (RAM), read only memory (ROM), electrically programmable read only memory (EPROM), electrically erasable programmable read only memory (EEPROM)) positioned within the housing. The controller(s) as disclosed also includes hardware-based inputs and outputs for receiving and transmitting data, respectively from and to other hardware-based devices as discussed herein.

It is also recognized that directional terms that may be noted herein (e.g., "upper", "lower", "inner", "outer", "top", "bottom", etc.) simply refer to the orientation of various components of a loudspeaker assembly as illustrated in the accompanying figures. Such terms are provided for context and understanding of the embodiments disclosed herein. Multiple embodiments are disclosed below and it is herein understood that similar reference numerals may be disclosed in connection with the different embodiments and that such reference numerals will not be described for every occurrence of these reference numerals in the embodiments for purposes of brevity.

Aspects disclosed herein generally utilize at least one communication transmitter (e.g., wireless electronic communication device with at least one wireless transmitter) that is positioned on a loudspeaker assembly in a line array of loudspeaker assemblies that communicate with a server (or central hub). In general, each loudspeaker assembly in the line array may be assigned a unique electronic identifier that may be transmitted to a server via the communication transmission tag. The unique electronic identifier may be in any format. At least one communication receiver (e.g., wireless electronic communication device with at least one wireless transmitter) may also be positioned on the loudspeaker assembly in the line array of loudspeaker assemblies. The communication receiver(s) for a given loudspeaker assembly in the array may receive the unique electronic identifiers from adjacent loudspeaker assemblies and the communication transmitter for the given loudspeaker assembly transmit such information to the server. This is performed for each loudspeaker assembly that is positioned in the line array. The server utilizes the unique identifier information as received from each of the loudspeaker assemblies to generate a map of the loudspeaker assemblies to identify the location for each location assembly of the line array. Thus, a user may ascertain the location of a particular loudspeaker assembly in the line array to diagnose or otherwise service the loudspeaker assembly of interest in the line array. These aspects and others will be discussed in more detail herein.

FIG. 1 generally depicts an example of a loudspeaker assembly 100 for a line array of loudspeakers 102 in accordance to one embodiment. In general, the loudspeaker assembly 100 may be positioned in a venue and playback audio data for users in the venue. In one example, the loudspeaker assembly 100 may be a subwoofer (or woofer), mid-range driver, tweeter or any combination thereof that is positioned in a housing 104. Each of the woofer, mid-range driver, or tweeter may include at least one cone (or diaphragm) and electronics for receiving the audio for playback by any number of amplifiers also positioned in the venue. The loudspeaker assembly 100 may transmit the audio data into the venue via a first end 110 of the loudspeaker assembly 100.

The loudspeaker assembly 100 generally includes a communication transmitter 112 and first and second communication receivers 114*a*-114*b*, respectively. The communication transmitter 112 is generally configured to wirelessly transmit data to a server 116. The loudspeaker assembly 100 generally stores a unique identifier that provides information corresponding to an identity of the loudspeaker assembly 100. The first communication receiver 114*a* may be positioned on a top side of the loudspeaker assembly 100. The second communication receiver 114*b* may be positioned on a bottom side of the loudspeaker assembly 100. The first and the second communication receivers 114*a*, 114*b* are generally configured to receive the unique identifier from other loudspeaker assemblies that are positioned in the array 102. This aspect will be discussed in more detail below. In one example, the communication transmitter 112 may communicate with the server 116 via WiFi, Ethernet, or other suitable wireless protocol. Additionally, the server 116, for example, may execute instructions to run centralized software such as Performance manager, CloudworX, etc.

Figure 2:
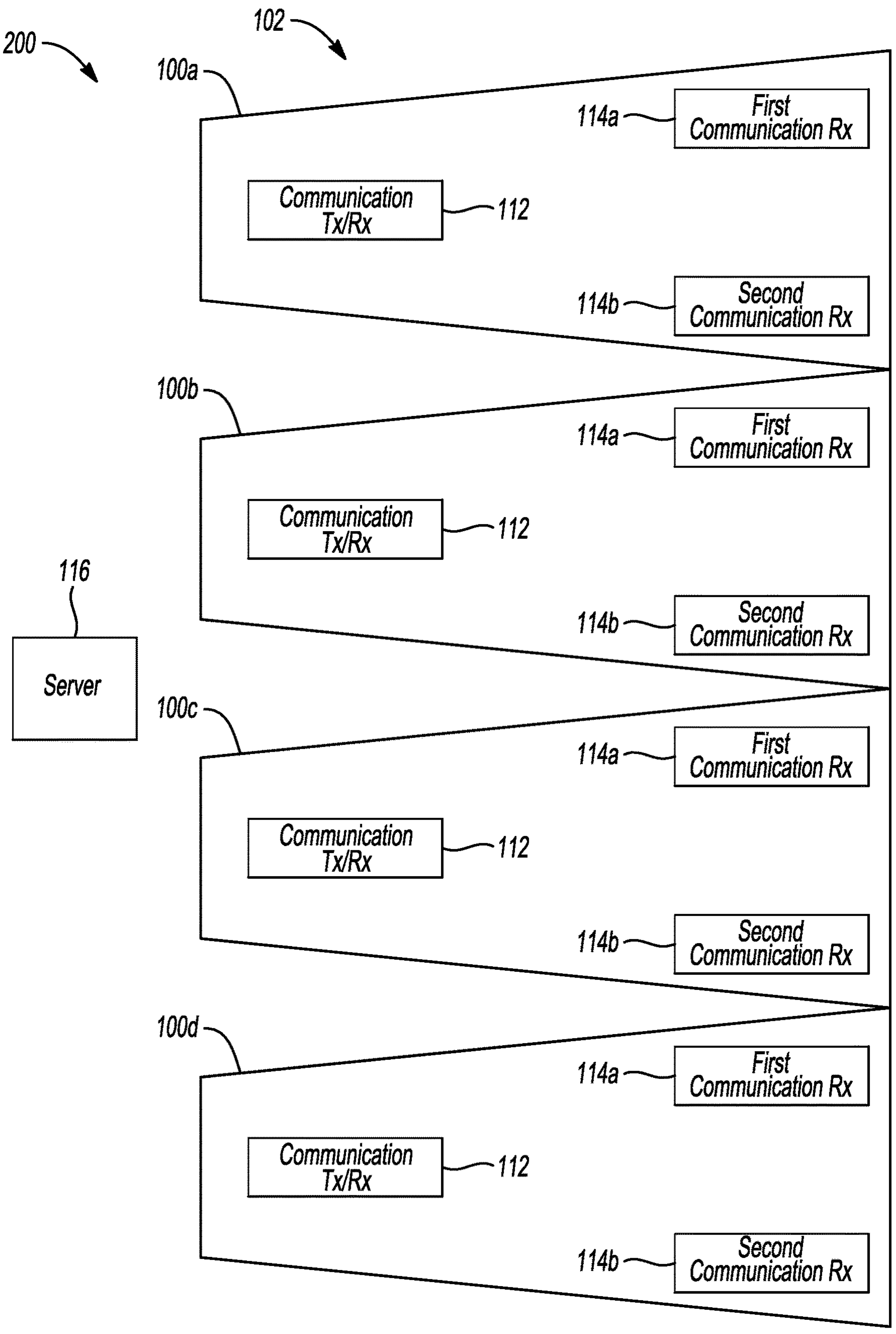
FIG. 2 generally depicts a system for generating location map for loudspeakers orientated in the line array of loudspeakers in accordance to one embodiment.

FIG. 2 generally depicts a system 200 for generating a location map for loudspeaker assemblies 100*a*-100*n* orientated in the line array of loudspeakers 102 in accordance to one embodiment. The system 200 includes a plurality of loudspeaker assemblies 100*a*-100*d* that are arranged in the line array 102. It is recognized that the number of loudspeaker assemblies 100*a*-100*d* utilized in the line array 102 may vary based on the desired criteria of a particular implementation. The line array 102 of the loudspeaker assemblies may be arranged vertically. It is recognized that the line array 102 may also be aligned horizontally. As illustrated in FIG. 2, each loudspeaker assembly 100*a*-100*d* includes the communication transmitter 112, and the first and second communication receivers 114*a*, 114*b*.

The first and second communication receivers 114*a*, 114*b* for each of the loudspeaker assemblies 100*a*-100*d* are generally configured to receive the unique identifier from a communication transmitter 112 of an adjacent loudspeaker assembly 100*a*-100*b*. For example, loudspeaker assembly 100*a* receives data from loudspeaker speaker assembly

100*b*; loudspeaker assembly 100*b* receives data from loudspeaker assemblies 100*a* and 100*c*, loudspeaker assembly 100*c* receives data from loudspeaker assemblies 100*b* and 100*d*, and loudspeaker assembly 100*d* receives data from loudspeaker assembly 100*c*. In general, communication between the loudspeaker assemblies 100*a*-100*d* may be achieved via a short-range wireless protocol such as Near Field Communication (NFC) or other suitable protocol. The short-range wireless protocol utilized in the system 200 may be advantageous to enable each loudspeaker assembly 100*a*-100*d* to receive data/messages from loudspeaker assemblies 100*a*-100*d* that are directly adjacent to one another.

Each loudspeaker assembly 100*a*-100*d* transmits data corresponding to the received unique identifiers from adjacent loudspeaker assemblies 100*a*-100*d* to the server 116. The server 116 generates a map corresponding to the location of the loudspeaker assemblies 100*a*-100*d* based on the unique identifiers received from the various loudspeaker assemblies 100*a*-100*d*. The manner in which the server 116 generates the map will be discussed in more detail below.

Figure 3:
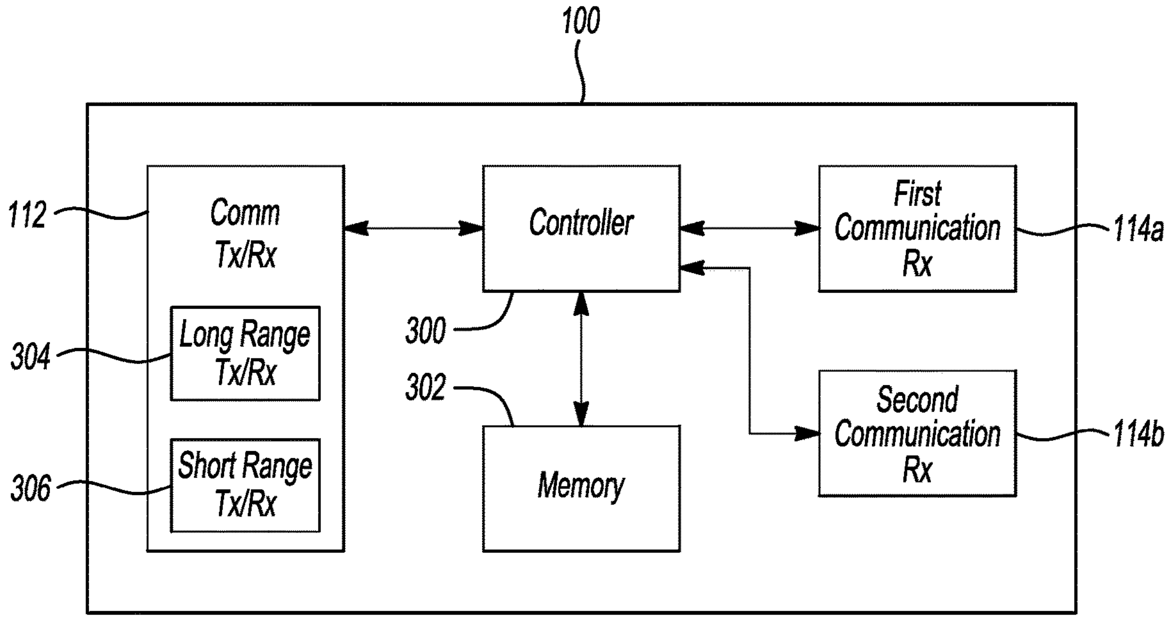
FIG. 3 depicts a more detailed implementation of the loudspeaker assembly in accordance to one embodiment.

FIG. 3 depicts a more detailed implementation of the loudspeaker assembly 100 in accordance to one embodiment. The loudspeaker assembly 100 may further include at least one controller 300 (or controller 300 hereafter) and memory 302. The communication transmitter 110 generally includes a long-range transceiver 304 and a short-range transceiver 306. In general, the memory 302 may store the unique identifier for a corresponding loudspeaker assembly 100. The memory 302 may provide the unique identifier to the controller 300 which then transmits the same to the communication transmitter (or communication transceiver) 112. The controller 300 may then instruct the communication transmitter 112 to transmit the unique identifier to the server 116 via the long-range transceiver 304. The long-range transceiver 304 may transmit the unique identifier to the server 116 via WIFI or other suitable protocol. Additionally, the communication transmitter 112 may also transmit the unique identifier to adjacent loudspeaker assemblies 100 in the line array 102 (e.g., to the first and second communication receivers 114*a*, 114*b* via the short-range transceiver 306). In one example, the short-range transceiver 306 may be implemented also as an NFC transceiver or other transceiver that supports short range communication.

FIG. 4 generally depicts a message format 450 for a message as transmitted from the loudspeaker assembly 100 (e.g., transmitting loudspeaker assembly 100) of the line array 102 in accordance to one embodiment. In particular, the message format 450 is transmitted from the loudspeaker assembly 100 of the line array 102 to the server 116. The message format 450 defines a plurality of bytes 452*a*-452*e*. Byte 452*a* (e.g., "Byte 1") includes information corresponding to the speaker ID (or unique identifier) of the loudspeaker speaker assembly 100 that transmits the message format 450 to the server 116. Byte 452*b* (e.g., "Byte 2") is indicative of an identifier to alert the server 116 that the next byte, (e.g., the 452*c*) will provide information from the second communication receiver 114*b* (e.g., the communication receiver 114*a* that is positioned near or at the bottom of the loudspeaker assembly 100). In this case, byte 452*d* (e.g., "Byte 3") provides the unique identifier as received from a loudspeaker assembly 100 that is positioned below the transmitting loudspeaker assembly 100. Byte 452*d* (e.g., "Byte 4") is indicative of an identifier to alert the server 116 that the next byte, (e.g, the 452*e*) will provide information from the second communication receiver 114*b* (e.g., the communication receiver 114*a* that is positioned near or at the top of the loudspeaker assembly 100). In this case, byte 452*e* provides the unique identifier as received from a loudspeaker assembly 100 that is positioned above the transmitting loudspeaker assembly 100.

It is recognized that the transmitting loudspeaker assembly 100 may transmit the message according to the message format 450 periodically, upon startup (or bootup), or on an event basis (e.g., new unique identifiers have been received and/or stored in the memory 302. Code may be stored in the memory 302 that enables the transmitting loudspeaker assembly 100 to transmit data in the message format 450. For example, such code may be executed by the controller 300. The code may be represented in the following C++ example (see Table 1 below).

TABLE 1

```
Struct msg
{
Char speaker_id;
Char Position_Character1
Char upper_speaker_id;
Char Position_Character2
Char lower_speaker_id;
}
```

In the event the transmitting loudspeaker assembly 100 is unable to read a unique identifier from the first communication receiver 114*a* (or fails to receive a unique identifier from another loudspeaker assembly 100), this condition may indicate that there are no other loudspeaker assemblies 100 positioned above the transmitting loudspeaker assembly 100. In this case, byte 452*e* may simply provide a predefined symbol to illustrate this condition. Further, in the event the transmitting loudspeaker assembly 100 is unable to read a unique identifier from the second communication receiver 114*b* (or fails to receive a unique identifier from another loudspeaker assembly 100), this condition may indicate that there are no other loudspeaker assemblies 100 positioned below the transmitting loudspeaker assembly 100. In this case, byte 452*c* may simply indicate provide the predefined symbol to illustrate this condition.

Referring back to FIG. 2 and further in reference to FIG. 5, the loudspeaker assembly 100*a* may be assigned a unique identifier "01" (e.g., see generally at 460 in FIG. 5) and the loudspeaker assembly 100*a* is generally configured to provide the unique identifier "01" to the first communication receiver 114*a* of the loudspeaker assembly 100*b*. The loudspeaker assembly 100*b* may be assigned a unique identifier "FD" (e.g., see generally at 460 in FIG. 5). In this case, the loudspeaker assembly 100*b* is generally configured to transmit the unique identifier "FD" to the second communication receiver 114*b* (e.g., bottom communication receiver 114*b*) of the loudspeaker assembly 100*a* and to the first communication receiver 114*a* (e.g., top communication receiver 114*a*) of the loudspeaker assembly 100*c*.

The loudspeaker assembly 100*c* may be assigned a unique identifier "FC" (e.g., see generally at 460 in FIG. 5). In this case, the loudspeaker assembly 100*c* is generally configured to transmit the unique identifier "FC" to the second communication receiver 114*b* (e.g., bottom communication receiver 114*b*) of the loudspeaker assembly 100*b* and to the first communication receiver 114*a* (e.g., top communication receiver 114*a*) of the loudspeaker assembly 100*d*. The loudspeaker assembly 100*d* may be assigned a unique identifier "FE" (e.g., see generally at 460 in FIG. 5) and the loudspeaker assembly 100*d* is generally configured to provide the unique identifier "FE" to the second communication receiver 114*b* of the loudspeaker assembly 100*c*. In light of the foregoing, the unique identifiers as transmitted from the loudspeaker assemblies 100*a*-100*d* include the following message format 450 as illustrated in FIG. 5. It bears mentioning that "*" as illustrated in byte 452*e* for the loudspeaker assembly 100*a* denotes that the predefined symbol. "FF" indicates that loudspeaker assembly 100*a* is unable to receive the unique identifier from a loudspeaker assembly positioned above the loudspeaker assembly 100*a*. For example, the loudspeaker assembly 100*d* is positioned at the top of the line array 102. In addition, "*" as illustrated in the byte 452*c* denotes that the loudspeaker assembly 100*d* is unable to receive the unique identifier from a loudspeaker assembly positioned below the assembly 100*d*. For example, the loudspeaker assembly 100*d* is positioned at the bottom of the line army 102.

It is recognized that the various loudspeaker assemblies 100*a*-100*d* may transmit the messages as illustrated in FIG. 5, for example, in any order to the server 116. The server 116 may generate the position or location map of the loudspeaker assemblies 100*a*-100*d* based on the data as illustrated in FIG. 5. The manner in which the server 116 may assemble or generate the location map will be discussed in more detail in connection with FIG. 6.

Figure 6:
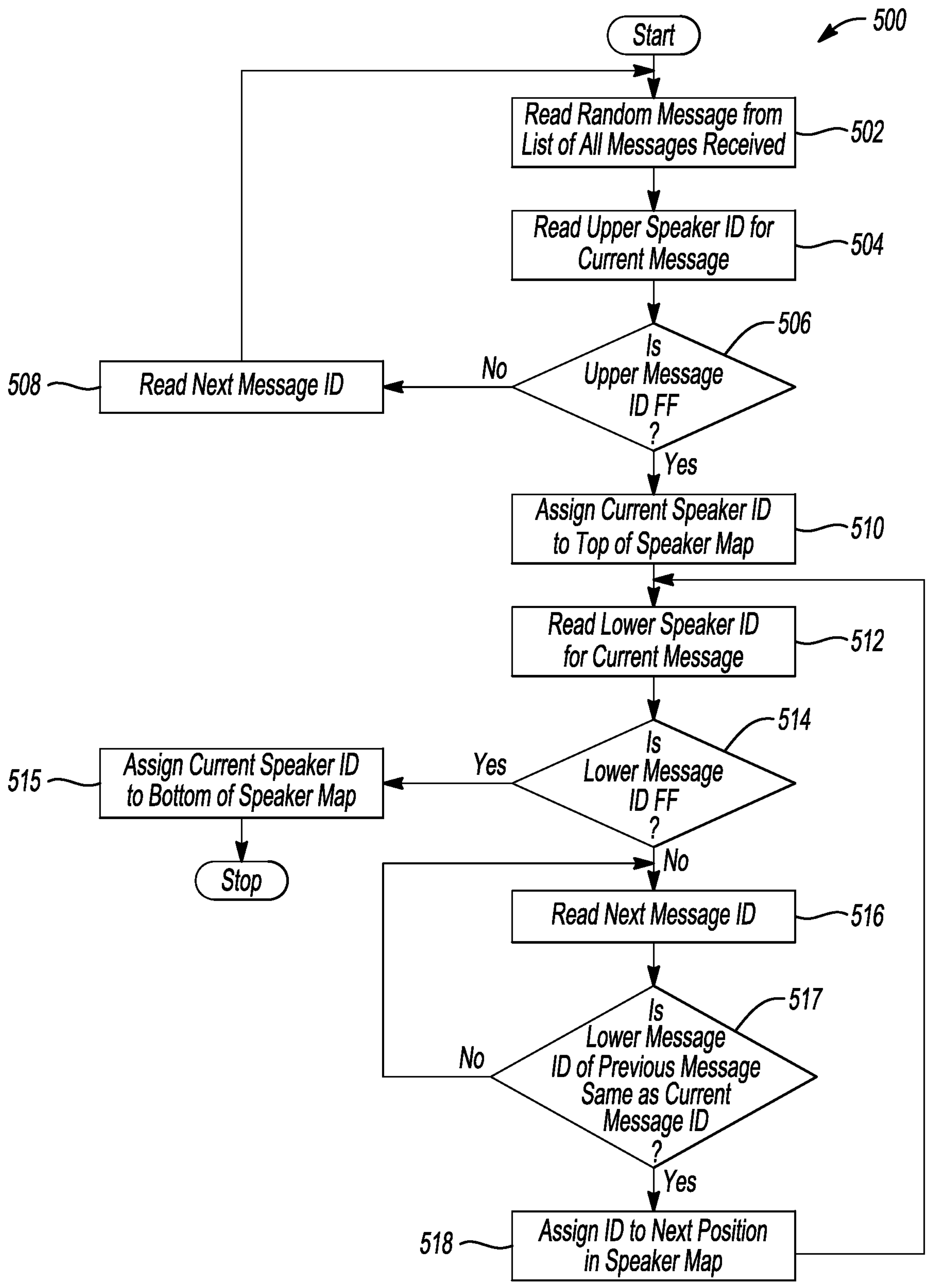
FIG. 6 generally depicts a method for generating the location map for the loudspeakers orientated in the line array of loudspeakers in accordance to one embodiment.

FIG. 6 generally depicts a method 500 for generating the location map for loudspeaker assemblies 100 orientated in the line array 102 in accordance to one embodiment.

In operation 502, the server 116 receives and stores the random messages from the various loudspeaker assemblies 100*a*-100*d* in the message format 450 (e.g., see data transmitted by the loudspeaker assemblies 100*a*-100*d* as illustrated in FIG. 5). In operation 504, the server 116 reads byte 452*e* from the received message formats 450 to obtain information corresponding to "upper" loudspeaker assemblies 100*a*-100*d* or the corresponding loudspeaker speaker assemblies that are positioned above the transmitting loudspeaker assembly.

In operation 506, the server 116 determines whether the data positioned in byte 452*e* corresponds to the predefined symbol "FF". As indicated above, the predefined symbol "FF" is indicative of a corresponding loudspeaker assembly 100 that is unable to receive the unique identifier from a loudspeaker assembly positioned above the corresponding loudspeaker assembly 100. In the event the predefined symbol FF is found in byte 452*e*, then the method 500 proceeds to operation 510. If not, then the method 500 proceeds to operation 508.

In operation 508, the server 116 reads the next message as received from a different loudspeaker assembly 100. In operation 510, the server 116 assigns the unique identifier for the loudspeaker assembly 100*a* as the loudspeaker assembly 100*a* that is positioned at a top position in the line array 102 since in this example, the loudspeaker assembly 100*a* does not have a loudspeaker assembly positioned there above. As illustrated FIG. 5, the loudspeaker assembly 100*a* includes "FF" positioned in byte 452*e*.

In operation 512, the server 116 reads the byte 452*c* of the same message that includes the predefined symbol "FF" in the byte 452*e*. In this case, the server 116 is attempting to locate the corresponding loudspeaker assembly that is positioned below the top (or upper most) loudspeaker assembly 100 in the line array 102.

In operation 514, the server 116 determines whether the data positioned in byte 452*c* corresponds to the predefined symbol "FF". As indicated above, the predefined symbol "FF" is also indicative of a corresponding loudspeaker assembly 100 that is unable to receive the unique identifier from a loudspeaker assembly positioned below the corresponding loudspeaker assembly 100. In the event the predefined symbol FF is found in the byte 452*c*, then the method 500 proceeds to operation 515 which is the end of the map generation process (or ends the generation of the location map for the loudspeaker assemblies 100 in the array 102). If not, then the method 500 proceeds to operation 516 to continue to locate the loudspeaker assembly 100 that transmits predefined symbol "FF" in the byte 452*c*.

In operation 515, the server 116 assigns the unique identifier for the loudspeaker assembly 100*d* as the loudspeaker assembly 100*d* that is positioned at a bottom position in the line array 102 since in this example, the loudspeaker assembly 100*d* does not have a loudspeaker assembly positioned below it.

In operation 516, the server 116 receives and stores the next message from the remaining loudspeaker assemblies 100*b* and 100*c* to determine their respective positions relative to the top loudspeaker assembly 100*a* (e.g., the loudspeaker assembly 100*a*).

In operation 517, the server 116 compares data in byte 452*c* of the previous message to the data (or unique identifier) stored in byte 452*a* of the currently received message from operation 516. If the data in byte 452*c* of the previous message matches the date (or unique identifier) stored in byte 452*a*, then the method 500 proceeds to operation 518. If not, then the method 500 proceed back to operation 516.

In operation 518, the server 116 assigns the unique identifier for the loudspeaker assembly as received in operation 516 to the next position in the map (e.g., this loudspeaker assembly is assigned to a position below the loudspeaker assembly 100 (i.e., the top loudspeaker assembly) as determined in operation 510. In this case, the method 500 proceeds back to operation 512 to determine if there are any additional loudspeaker assemblies positioned below loudspeaker assigned in operation 518. In general, the method 500 continues to loop back through operations 512, 514, 516, 517 and 518 until the predefined symbol "FF" is found to be in byte 452*c* for subsequently received messages.

In general, the system 200 and the method 500 illustrates that once the top loudspeaker assembly is located or assigned in the map, the system 200 and the method 500 may then determine the remaining locations of the loudspeaker assemblies positioned below the top loudspeaker assemblies based on reviewing the data in the bytes 452*c* and 452*e* for the messages received from such loudspeaker assemblies. It is recognized that the system 200 and the method 500 may be modified or revised such that the bottom loudspeaker assembly is located or assigned in the map first as opposed to the top loudspeaker. Once the bottom loudspeaker assembly is located, the system 200 and the method 500 may then determine the remaining locations of the loudspeaker assemblies positioned above the bottom loudspeaker based on reviewing the data in the bytes 452*c* and 452*e*.

It is further recognized that the system 200 and the method 500 may generate a location map for the array 102 for loudspeaker assemblies 100 that are arranged horizontally. For example, in this case, the first communication receiver 114*a* may be positioned on a left side of the loudspeaker assembly 100 and the second communication receiver 114*b* may be positioned on a right side of the loudspeaker assembly 100. The system 200 and the method 500 may then determine which of the loudspeaker assemblies is positioned on a far left side of the array 201 and determine the remaining locations adjacent to the loudspeaker assembly positioned on the far left side to the position of the loudspeaker assembly positioned on the far right side of the array 102 based on the teachings disclosed herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for generating a location map for a plurality of loudspeakers assemblies in a line array, the system comprising:
- a first loudspeaker assembly including:
  - at least one controller being programmed to:
    - receive a first unique identifier from a first adjacent loudspeaker assembly positioned in the line array, the first unique identifier being indicative of a location of the first adjacent loudspeaker assembly relative to the first loudspeaker assembly;
    - generate a message including the first unique identifier which is indicative of a location the first adjacent loudspeaker assembly relative to the first loudspeaker assembly; and
    - transmit the message to a server to generate the location map of the first loudspeaker assembly relative to the first adjacent loudspeaker assembly.

2. The system of claim 1, wherein the at least one controller is further programmed to insert a predefined symbol into the message in the event the at least one controller only receives the first unique identifier from the first adjacent loudspeaker assembly and fails to receive another unique identifier from another adjacent loudspeaker assembly.

3. The system of claim 2, wherein the at least one controller is further programmed to transmit a message including the first unique identifier and the predefined symbol to the server.

4. The system of claim 3, wherein the server is programmed to determine that the first loudspeaker assembly is located above the first adjacent loudspeaker assembly or below the first adjacent loudspeaker assembly based on the first unique identifier and the predefined symbol.

5. The system of claim 1, wherein the first loudspeaker assembly includes a first communication receiver positioned on a top side of the first loudspeaker assembly and a second communication receiver positioned on a bottom side of the first loudspeaker assembly.

6. The system of claim 5, wherein one of the first communication receiver and the second communication receiver is programmed to receive the first unique identifier from the first adjacent loudspeaker assembly.

7. The system of claim 6, wherein the at least one controller is further programmed to insert a predefined symbol in the message in the event the first communication receiver fails to receive another unique identifier from another adjacent loudspeaker assembly and the second communication receiver receives the first unique identifier from the first adjacent loudspeaker assembly.

8. The system of claim 7, wherein the server is programmed to determine that the first loudspeaker assembly is located above the first adjacent loudspeaker assembly based on the predefined symbol and the first unique identifier.

9. The system of claim 6, wherein the at least one controller is further programmed to insert a predefined symbol in the message in the event the second communication receiver fails to receive another unique identifier from another adjacent loudspeaker assembly and the first communication receiver receives the first unique identifier from the first adjacent loudspeaker assembly.

10. The system of claim 9, wherein the server is programmed to determine that the first loudspeaker assembly is located below the first adjacent loudspeaker assembly based on the predefined symbol and the first unique identifier.

11. A method for generating a location map for a plurality of loudspeaker assemblies in a line array, the method comprising:
- receiving at a first loudspeaker assembly a first unique identifier from a first adjacent loudspeaker assembly positioned in the line array, the first unique identifier being indicative of a location of the first adjacent loudspeaker assembly relative to the first loudspeaker assembly;
- generating, at the first loudspeaker assembly, a message including the first unique identifier which is indicative of a location the first adjacent loudspeaker assembly relative to the first loudspeaker assembly; and
- transmitting the message to a server to generate the location map of the first loudspeaker assembly relative to the first adjacent loudspeaker assembly.

12. The method of claim 11 further comprising inserting a predefined symbol into the message in the event the first loudspeaker assembly only receives the first unique identifier from the first adjacent loudspeaker assembly and fails to receive another unique identifier from another adjacent loudspeaker assembly.

13. The method of claim 12 further comprising transmitting the message including the first unique identifier and the predefined symbol to the server.

14. The method of claim 13 further comprising determining that the first loudspeaker assembly is located above the first adjacent loudspeaker assembly or below the first adjacent loudspeaker assembly based on the first unique identifier and the predefined symbol.

15. The method of claim 11, wherein the first loudspeaker assembly includes a first communication receiver positioned on a top side of the first loudspeaker assembly and a second communication receiver positioned on a bottom side of the first loudspeaker assembly.

16. The method of claim 15 further comprising receiving, at one of the first communication receiver and the second communication receiver, the first unique identifier from the first adjacent loudspeaker assembly.

17. The method of claim 16 further comprising inserting a predefined symbol in the message in the event the first communication receiver fails to receive another unique identifier from another adjacent loudspeaker assembly and the second communication receiver receives the first unique identifier from the first adjacent loudspeaker assembly.

18. The method of claim 17 further comprising determining at the server that the first loudspeaker assembly is located above the first adjacent loudspeaker based on the predefined symbol and the first unique identifier.

19. The method of claim 16 further comprising inserting a predefined symbol in the message in the event the second communication receiver fails to receive another unique identifier from another adjacent loudspeaker assembly and the first communication receiver receives the first unique identifier from the first adjacent loudspeaker assembly.

20. A computer-program product embodied in a non-transitory computer read-able medium stored in memory and that is executable by at least one controller programmed to generate a location map for a plurality of loudspeaker assemblies in a line array, the computer-program product comprising instructions for:

receiving at a first loudspeaker assembly a first unique identifier from a first adjacent loudspeaker assembly positioned in the line array, the first unique identifier being indicative of a location of the first adjacent loudspeaker assembly relative to the first loudspeaker assembly;

generating, at the first loudspeaker assembly, a message including the first unique identifier which is indicative of a location the first adjacent loudspeaker assembly relative to the first loudspeaker assembly; and transmitting the message to a server to generate the location map of the first loudspeaker assembly relative to the first adjacent loudspeaker assembly.

* * * * *